United States Patent [19]

Lane et al.

[11] Patent Number: 4,722,536
[45] Date of Patent: Feb. 2, 1988

[54] QUICK CHANGE CHUCK JAW

[75] Inventors: Brian M. Lane, Lafayette; Thomas F. Thompson, Burrows; John Wilson, Camden, all of Ind.

[73] Assignee: Logansport Machine Co., Inc., Logansport, Ind.

[21] Appl. No.: 827,814

[22] Filed: Feb. 7, 1986

[51] Int. Cl.$^4$ ............................................. B23B 31/12
[52] U.S. Cl. ................................... 279/123; 279/1 SJ
[58] Field of Search ............. 409/903; 279/1 B, 1 SJ, 279/4, 110, 123, 1 T, 1 S; 269/279, 280, 283

[56] References Cited

U.S. PATENT DOCUMENTS

| | | | |
|---|---|---|---|
| 630,202 | 8/1899 | Ekerdt | 279/123 |
| 2,950,117 | 8/1960 | Walmsley | 279/123 |
| 3,219,356 | 11/1965 | Wilterdink et al. | 279/123 |
| 3,244,430 | 4/1966 | Buck | 279/123 |
| 4,094,522 | 6/1978 | Hiestand | 279/114 |
| 4,383,682 | 5/1983 | Femberg | 269/283 |

FOREIGN PATENT DOCUMENTS

| | | | |
|---|---|---|---|
| 2813832 | 3/1978 | Fed. Rep. of Germany | 279/123 |
| 3345012 | 6/1985 | Fed. Rep. of Germany | 279/4 |
| 148383 | 7/1920 | United Kingdom | 279/123 |

Primary Examiner—Z. R. Bilinsky
Attorney, Agent, or Firm—Mason, Kolehmainen, Rathburn & Wyss

[57] ABSTRACT

A chuck for gripping a workpiece during a rotary operation includes a chuck body with a master jaw movably mounted on the chuck body. The master jaw includes a bayonet type locking structure. The master jaw also includes a face with at least one pin reciprocally mounted in and extending perpendicularly from the face. The pin is mechanically coupled to a piston reciprocally mounted in a piston chamber in the master jaw. The piston chamber is in communication with a source of pressurized fluid. The pin is reciprocated by selected communication of pressurized fluid to the piston chamber. A quick-change top jaw is also provided that may be quickly attached to and removed from the master jaw. The top jaw includes a bayonet type locking structure complementary to the bayonet type locking structure on the master jaw. The top jaw also includes an insert for capturing the pin in the master jaw. The top jaw is secured to the master jaw by placing the top jaw on the master jaw and aligning the bayonet locking structures. Pressurized fluid is then introduced into the piston chamber to withdraw the piston and pin. The top jaw is then rotated 90° locking the bayonet type locking structures. Pressurized fluid is then removed from the piston chamber releasing the pin which seats in the insert in the top jaw preventing rotational movement of the top jaw.

7 Claims, 7 Drawing Figures

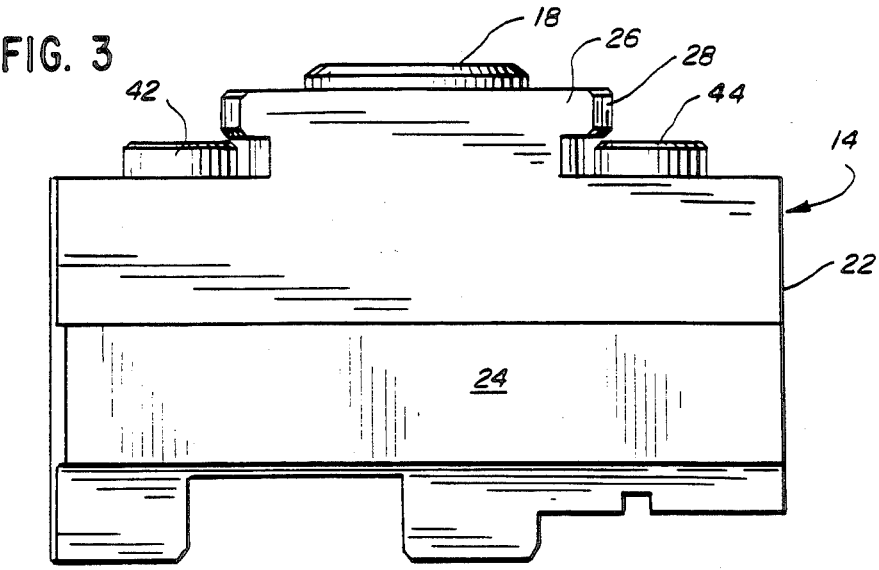
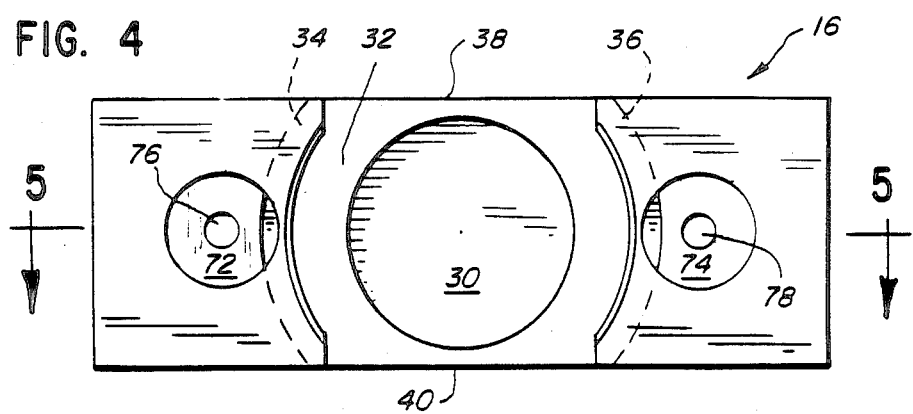
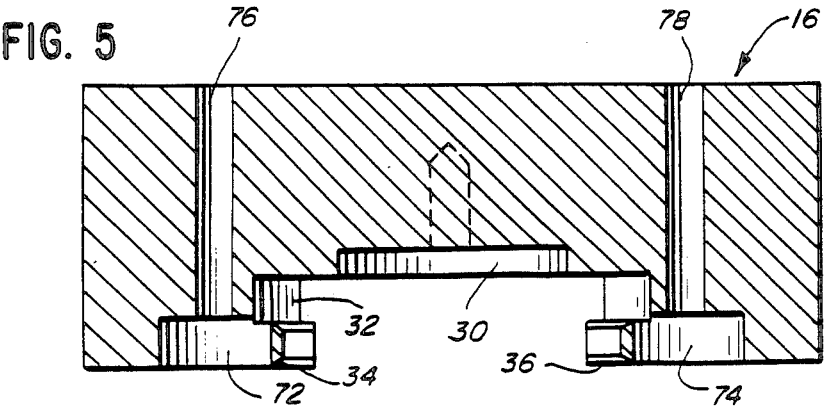

QUICK CHANGE CHUCK JAW

BACKGROUND OF THE INVENTION

A. Field of the Invention

The present invention relates to a new and improved device for gripping a workpiece during a rotary operation, and to a new improved method for quickly changing the gripping device to accommodate different operations and workpieces; and, more particularly, to a new and improved jaw assembly for a rotary chuck with a quick change top jaw and to a new and improved method for quickly attaching and removing a top jaw to and from a master jaw on a rotary chuck.

B. Description of the Background Art

Time is a critical, costly factor in the present manufacturing environment. During no previous period has awareness been keener that businesses live or die on their ability or inability to deliver the right number of manufactured goods to the right place at the right time. Few manufacturers, however, can afford to carry unlimited finished inventories in order to respond to unpredictable order cycles. This economic scenario accounts, in part, for the current trend toward shorter production runs.

To make shorter runs pay off, changeover and setup times must be cut to a minimum. This means jaw changes on chucks must be made in the shortest possible period of time. Today, however, estimates show that even an experienced operator with a complete set of top jaws including jaw nuts, keys and screws will require an average of twenty minutes to change a conventional set of jaws. Given a shop that normally performs three jaw changes per day, the sixty minutes of downtime means that twenty pieces will not be machined.

Presently, there are two basic quick-change designs for master and top jaws. In the first design the top jaw disengages from the master jaw and in the second design, the top and master jaws disengage from the chuck body as a single unit. Many of the designs include complicated structures that result in an expensive design. An example of one complicated design is provided in U.S. Pat. No. 3,219,356. Other designs use bolts to hold the top jaw to the master jaw as in U.S. Pat. No. 4,094,522. Although designs of this type allow easy change of the top jaws, the change is not quick. It is desirable to provide a chuck with a top jaw that may be changed quickly and easily and is not expensive to manufacture.

SUMMARY OF THE INVENTION

An object of the present invention is to provide a new and improved chuck.

Another object of the present invention is to provide a new and improved top jaw for a chuck.

A further object of the present invention is to provide a new and improved quick-change top jaw for a chuck.

A still further object of the present invention is to provide a new and improved method for changing a top jaw of a chuck.

Another object of the present invention is to provide a new and improved top jaw for a chuck that includes a dual system allowing quick and easy changing.

Briefly, the present invention is directed to a new and improved chuck for gripping a workpiece during a rotary operation. Rotary chucks are used for a variety of tasks and workpieces. When the workpiece or task is changed, the top jaw of the chuck must be changed. Since downtime results in loss of revenue for the shop using the chuck, it is desirable that removal and replacement of the top jaw be performed in a minimum amount of time.

To minimize the time required to change the top jaw of the chuck of the present invention, a quick-change top jaw is provided. The chuck of the present invention includes a master jaw that is radially reciprocated to grip a workpiece. The top jaw is removably mounted on the master jaw by a dual locking assembly. The dual locking assembly allows the use of a minimum number of components and a quick and easy change of the top jaw in a minimum of time.

The locking assembly includes a bayonet type locking structure on the master jaw and mating structure on the top jaw. The bayonet locking structure allows the top jaw to be positioned on the master jaw and rotated ninety degrees to engage the locking structure and secure the top jaw to the master jaw. To prevent the top jaw from rotating out of the locking position during rotation of the chuck, a second locking structure is provided.

The second locking structure includes indentations or recesses in the top jaw. Included in the second locking structure is at least one pin reciprocally mounted in the master jaw. The master jaw includes a reciprocating piston mechanically coupled to the pin and in fluid communication with a source of pressurized fluid. Control of pressurized fluid to the piston causes the pin to reciprocate into and out of engagement with the indentations in the top jaw. When the pin is located in the indentation, the top jaw is prevented from rotating relative to the master jaw and the top jaw is securely locked to the master jaw. To change the top jaw, the piston is reciprocated to move the pin out of the indentation. The top jaw may then be rotated relative to the master jaw to a position at which the bayonet type locking structure is disengaged and the top jaw may be removed and replaced with another top jaw.

BRIEF DESCRIPTION OF THE DRAWINGS

The above and other objects and advantages and novel features of the present invention will become apparent from the following detailed description of a preferred embodiment of the invention illustrated in the accompanying drawings wherein:

FIG. 3 is a side elevation view of the master jaw illustrated in FIG. 2;

FIG. 4 is a bottom plan view of a quick-change top jaw of the present invention;

FIG. 5 is a view of the quick-change top jaw of the present invention taken generally along line 5—5 of FIG. 4;

DESCRIPTION OF THE PREFERRED EMBODIMENT

Figure 1:
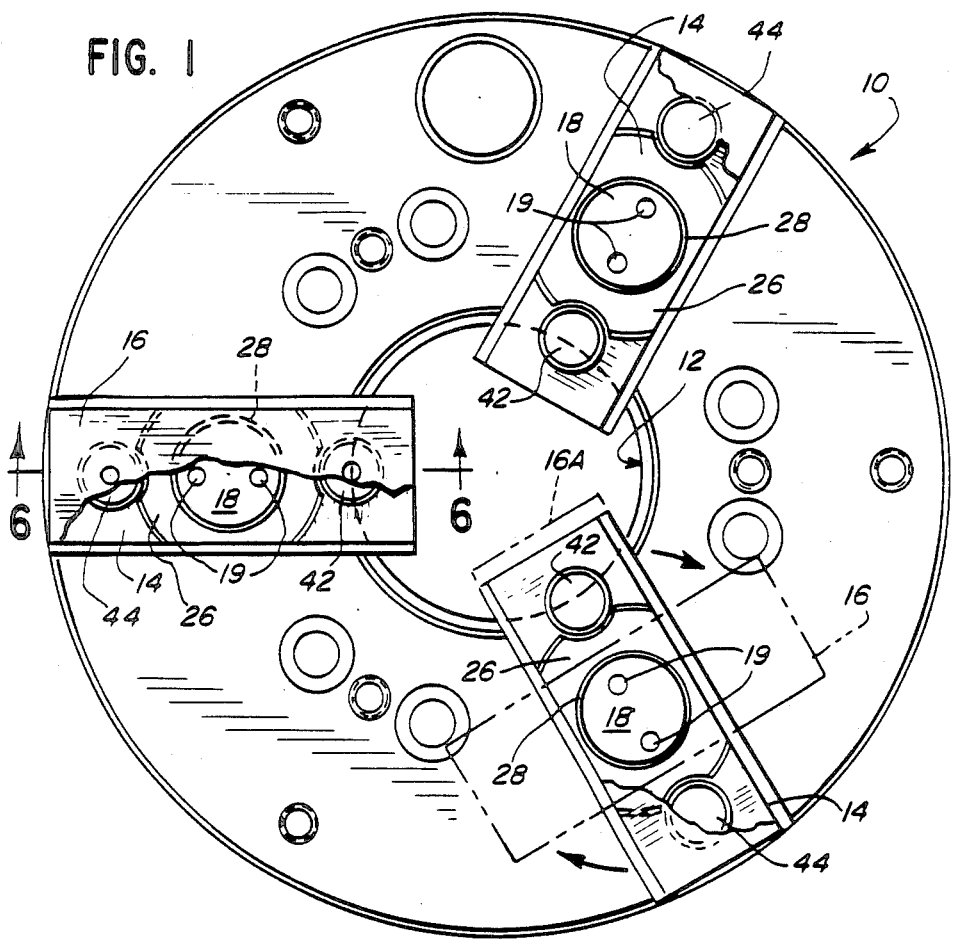
FIG. 1 is a top plan view of a chuck for gripping a workpiece during a rotary operation including master jaws and quick-change top jaws constructed in accordance with the principles of the present invention.

Referring to the drawings and initially to FIG. 1, there is illustrated a chuck generally designated by the reference numeral 10. Chuck 10 is of the rotary type used to grip a workpiece during a rotary operation. The chuck 10 may include a central aperture 12 and has a plurality of radially moving master jaws 14 and top jaws 16 which are actuated to grip and release the workpiece. The structure of chuck 10 and the actuating mechanism for actuating master jaws 14 and top jaws 16 is fully described in U.S. Pat. No. 4,139,206 assigned to the assignee of the present invention. U.S. Pat. No. 4,139,206 is incorporated by reference and reference may be made to this patent for complete details of this structure.

During a normal day of operation, chuck 10 will be used for several different tasks and on several different workpieces. To accommodate different workpieces or tasks, the top jaws 16 must be changed. In a typical day, top jaws 16 may be changed three times. Each changeover of prior art jaws normally requires twenty minutes. During the sixty minutes of downtime each day to change the top jaws, it has been estimated that twenty pieces could have been machined. This results in a significant loss of revenue to the owner of chuck 10. To reduce the downtime resulting from changing top jaws and increase profits, top jaws 16 have been developed to include quick change capability and are disclosed herein. Quick-change top jaws 16 can be quickly changed by the operator of chuck 10 without the need of several tools and in a very short time reducing downtime.

The quick-change feature of each top jaw 16 is accomplished by a dual locking assembly. The first portion of the dual locking assembly includes a bayonet type lock allowing top jaw 16 to be attached to a master jaw 14 by hand. This locking structure includes a fixed locking projection or plug 18 on each master jaw 14 that is threaded into a piston chamber 20 (FIGS. 6A and 6B) defined in body 22 of master jaw 14. Plug 18 includes holes 19 into which a spanner wrench may be inserted for threading plug 18 into piston chamber 20.

The body 22 of master jaw 14 includes a main body 24 and an upstanding collar 26. A circumferential ring 28 is defined on the top of collar 26 extending radially outward. Ring 28 defines the part of the bayonet locking structure providing mechanical connection with the quick-change top jaw 16.

The bottom surface of each quick-change top jaw 16 includes locking structure complementary to locking projection 18, collar 26 and ring 28. Each top jaw 16 includes a locating recess 30 into which plug 18 is located to align master jaw 14 and top jaw 16 in preparation for locking the jaws 14 and 16 together. Top jaw 16 further includes a second recess 32 for location of ring 28. Semi-circular shelves 34 and 36 are secured to each top jaw 16 below and adjacent the second recess 32.

The above-described bayonet locking assembly allows quick attachment of master jaw 14 and top jaw 16 in the following manner. With reference to FIG. 1, quick-change top jaw 16 is illustrated in dotted lines in a perpendicular or right angle orientation to master jaw 14. This orientation corresponds to the first step in connection of jaws 14 and 16. Jaw 16 is positioned perpendicularly to master jaw 14 and moved parallel to the upper surface of master jaw 14 allowing flats on collar 28 to move through openings 38 or 40 (FIG. 4) between shelves 34 and 36 until plug 18 is located in recess 30 and ring 28 is in recess 32 and held by shelves 34 and 36. Once plug 18 is located in recess 30, the operator of chuck 10 need only rotate quick-change top jaw 16 ninety degrees in the direction of the arrows in FIG. 1 to the dotted position 16A. In this latter position the bayonet lock is engaged and master jaw 14 and quick-change top jaw 16 are mechanically coupled together.

Although the first portion of the dual locking assembly, the bayonet type lock, secures master jaw 14 and quick-change top jaw 16 together, rotary motion of chuck 10 during operation could cause quick-change top jaw 16 to rotate to the position 16 illustrated in dotted lines in FIG. 1 allowing inadvertent release of quick-change top jaw 16 from master jaw 14. The possibility of this rotation occurring is prevented by the second portion of the dual locking assembly which includes indexing pins 42 and 44.

Figure 2:
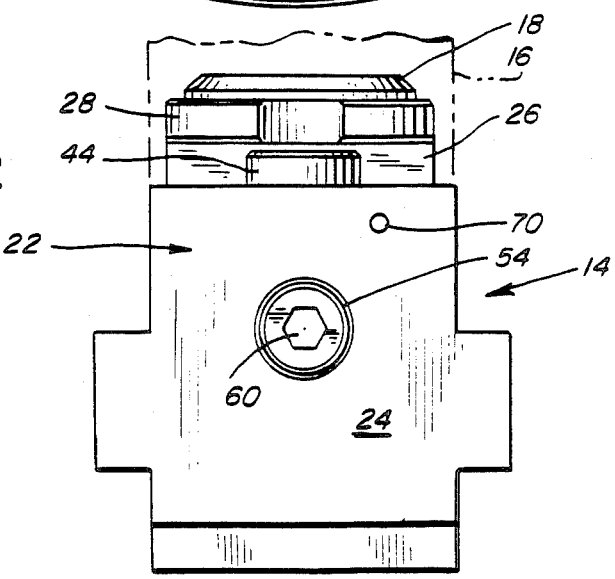
FIG. 2 is an end elevation view of a master jaw of the present invention.

Indexing pins 42 and 44 are mounted in bores 46 and 48, respectively, in master jaw body 22 and reciprocated in bores 46 and 48, respectively, by a piston 50 reciprocally mounted in piston chamber 20. Piston 50 is mechanically connected to pins 42 and 44 by a pair of shoulder screws 52. Shoulder screws 52 are introduced through access holes 54 in master jaw body 22 and extend through bores 56 and 58 in pins 42 and 44, respectively. Screws 52 are threaded into piston 50. After connecting piston 50 and pins 42 and 44 by the screws 52, access holes 54 are plugged with pipe plugs 60 (FIG. 2). Index pins 42 and 44 are biased upward out of bores 46 and 48 by springs 62 and 64, respectively, positioned in recesses 63 and 65 in pins 42 and 44, respectively. Similarly, piston 50 is biased by spring 66 positioned in a recess 67 in piston 50.

To allow rotation of the quick-change top jaws 16 relative to the master jaws 14, pins 42 and 44 must be retracted. Piston 50 and pins 42 and 44 are retracted by the introduction of pressurized fluid into piston chamber 20 at the upper surface of piston 50. Piston chamber 20 is in communication with a source of pressurized fluid through a passage 68 having an inlet 70 that is coupled to the source of pressurized fluid. A tool may also be used to retract pins 42 and 44 if desired.

Figure 6A:
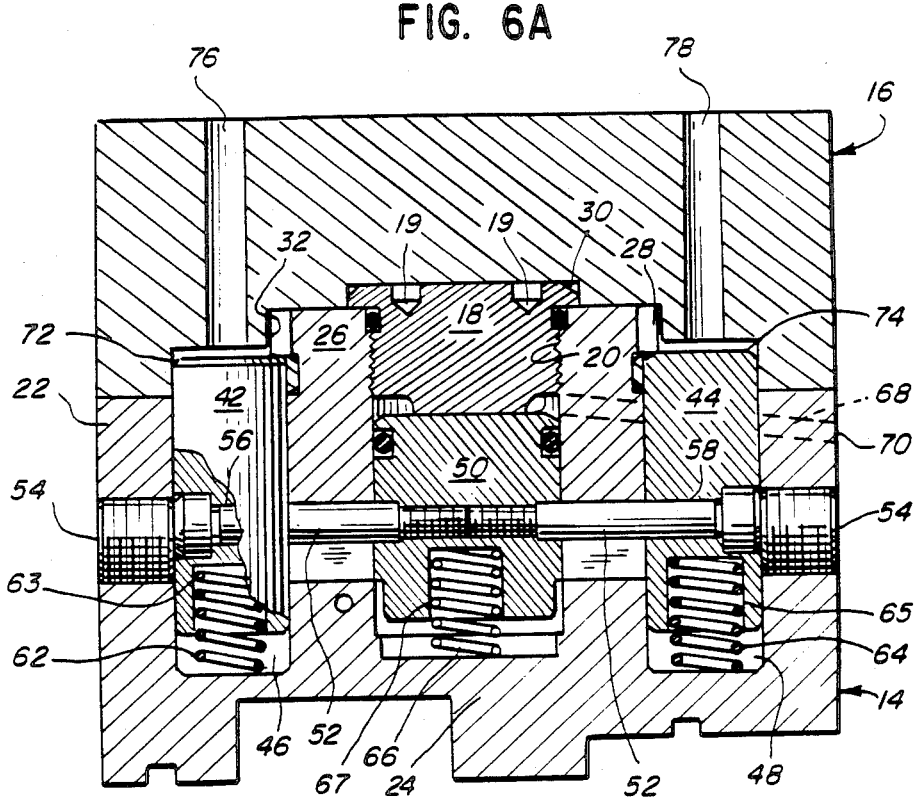
FIG. 6A is a vertical cross-sectional view of a master jaw and quick-change top jaw of the present invention with indexing pins located in recesses of the quick-change top jaw.
Figure 6B:
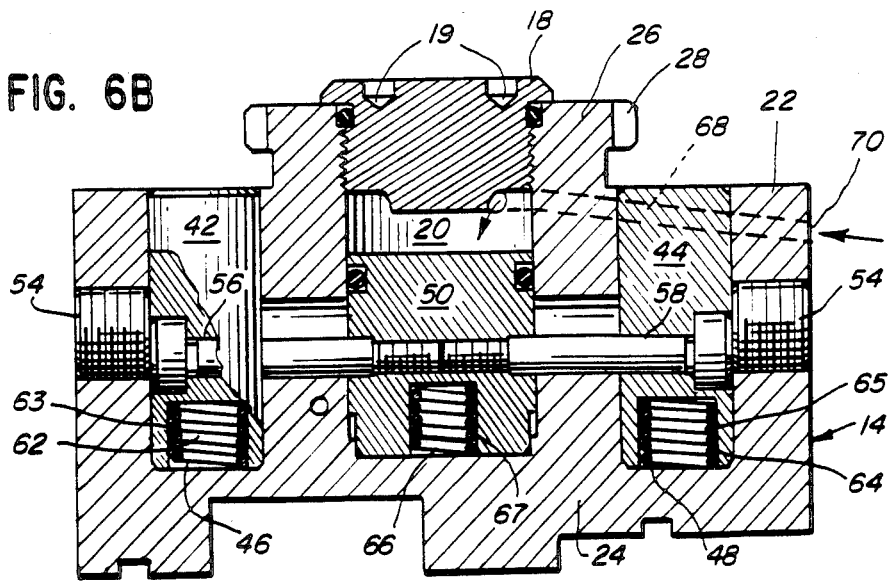
FIG. 6B is a view similar to FIG. 6A with the indexing pins retracted and the quick-change top jaw removed.

Prior to securing each quick-change top jaw 16 to a master jaw 14, pins 42 and 44 are retracted (FIG. 6A) to allow top jaw 16 to be rotated from the position 16 shown in dotted lines in FIG. 1 to position 16A also shown in dotted lines in FIG. 1. Once each quick-change top jaw 16 is in the fully secured position 16A (FIG. 1), pressurized fluid is removed from piston chamber 20 and pins 42 and 44 move into recesses 72 and 74, respectively, defined in top jaw 16 (FIG. 6A). This positioning of indexing pins 42 and 44 locks each quick-change top jaw 16 preventing rotational movement relative to the corresponding master jaw 14 during operation of chuck 10.

To remove the quick-change top jaws 16, pressurized fluid is introduced into piston chamber 20 to retract pins 42 and 44. Each of quick-change top jaw 16 may then be easily rotated from position 16A to position 16 in FIG. 1 and removed from the corresponding master jaw 14. Another quick-change top jaw 16 may then be secured to each master jaw 14. In case of an emergency, access holes 76 and 78 are provided in top jaw 16 which extend into recesses 72 and 74, respectively, allowing insertion of a tool to depress pins 42 and 44 releasing quick-change top jaw 16.

The dual locking assembly of the present invention allows quick and easy changing of top jaws while providing a sure connection that will not be disabled during operation of chuck 10. The dual locking assembly requires few moving parts significantly reducing the cost of top jaws and master jaws and requires no or few tools for attaching or removing each top jaw thereby reducing the cost of changing top jaws and the downtime of chuck 10.

What is claimed and sought to be secured by Letters Patent of the United States is:

1. A chuck assembly for gripping a rotating workpiece comprising:
    a chuck body rotatable about a main axis of rotation;
    a plurality of master jaws mounted on said chuck body for movement in radial directions toward and away from said main axis;
    a plurality of workpiece engaging top jaws, one being secured to each of said master jaws;
    said chuck assembly being characterized by a plurality of improved quick change locking assemblies for releasably securing said top jaws to said master jaws; said locking assemblies consisting essentially of:
    a first locking structure including interengagable first and second elements on said master jaw and top jaw permitting rotation of said top jaw on said master jaw between release and locked positions and preventing axial movement of said top jaw away from said master jaw in said locked position; and
    a second locking structure including at least one third element and one fourth element on said master and top jaws spaced from said first and second elements and movable relative to one another between retracted and engaged positions in said locked position for preventing rotation of said top jaw on said master jaw; and
    operating means for moving said third and fourth elements relative to one another between said retracted and engaged positions.

2. A chuck assembly as claimed in claim 1, said first and second elements of said first locking structure comprising a bayonet lock.

3. A chuck assembly as claimed in claim 2, said first element comprising a collar and ring extending upward from said master jaw and said second element comprising a locating recess and shelf structure on said top jaw.

4. A chuck assembly as claimed in claim 1, said third and fourth elements of said second locking structure comprising a recess in said top jaw and a pin in said master jaw having an axially extending surface received in said recess in said engaged position.

5. A chuck assembly as claimed in claim 4, said second locking structure including two said pins and two said recesses spaced from one another on opposite sides of said first locking structure.

6. A chuck assembly as claimed in claim 1, said operating means including biasing means continuously urging said third and fourth elements into said engaged position, and a retraction mechanism selectively operable for moving said third and fourth elements to said retracted position.

7. A chuck assembly as claimed in claim 6, said retraction mechanism including a cylinder in said top jaw and a pressure fluid operated piston movable in said cylinder.

* * * * *